United States Patent [19]

Matsumoto

[11] 4,318,380
[45] Mar. 9, 1982

[54] INTAKE SYSTEM FOR MULTI-CYLINDER INTERNAL COMBUSTION ENGINE

[75] Inventor: Hiromitsu Matsumoto, Hamamatsu, Japan

[73] Assignee: Yamaha Hatsudoki Kabushiki Kaisha, Iwata, Japan

[21] Appl. No.: 85,776

[22] Filed: Oct. 16, 1979

[30] Foreign Application Priority Data

Oct. 17, 1978 [JP] Japan ................................. 53-128236

[51] Int. Cl.³ ........................ F02B 47/08; F02B 29/02
[52] U.S. Cl. ............................... 123/432; 123/59 PC; 123/308; 123/52 M
[58] Field of Search ................ 123/52 M, 59 PC, 308, 123/432, 442, 546, 548, 547; 261/144, 145, 50 A, 44 R

[56] References Cited

U.S. PATENT DOCUMENTS

| | | | |
|---|---|---|---|
| 3,456,634 | 7/1969 | Nelson | 123/547 |
| 3,930,478 | 1/1976 | Brettshneider | 123/546 |
| 4,186,706 | 2/1980 | Matsumoto | 123/432 |
| 4,194,474 | 3/1980 | Endo | 123/432 |
| 4,240,387 | 12/1980 | Motosugi | 123/308 |
| 4,261,316 | 4/1981 | Motosugi | 123/568 |

Primary Examiner—Ronald H. Lazarus
Attorney, Agent, or Firm—Ernest A. Beutler

[57] ABSTRACT

Several embodiments of induction systems for multiple cylinder internal combustion engines that improve engine performance, particularly at idle and low speed. In each embodiment a charge is delivered to the chambers at idle and low speed through a relatively small cross sectional area auxiliary induction system for improving turbulence in the chamber at the time of combustion. The auxiliary induction passages communicate with each other so that the idle charge for a given chamber that is on its intake cycle will be supplied from the portion of the other induction systems downstream of a manually operated throttle valve. Upstream of the manually operated throttle valves there is provided another throttle valve which cooperates with an idle fuel discharge so that the idle fuel is delivered to the various chambers.

7 Claims, 6 Drawing Figures

INTAKE SYSTEM FOR MULTI-CYLINDER INTERNAL COMBUSTION ENGINE

SUMMARY OF THE INVENTION

This invention relates to an induction system for an internal combustion engine and more particularly to an improved intake system for multiple chamber engines.

Recently it has been acknowledged that the efficiency of operation of an engine can be improved by providing the chamber charge requirements at idle and low load through a relatively small auxiliary induction system. In conjunction with such an arrangement a manually operated throttle valve is provided in the main induction system adjacent each combustion chamber for controlling the flow. As is well known, most carbureted engines employ an idle arrangement that necessitates cooperation between the carburetor throttle valve and the idle discharge port or ports. Where such an arrangement is used with manually operated throttle valves close to the engine combustion chambers, as with the previously described construction, it was necessary to provide in some instances a separate idle system for each combustion chamber. Such an arrangement is not only complicated, but furthermore, is expensive.

In addition, there is a practical limit in the physical orientation of the carburetor relative to the engine combustion chambers. Because of spacial considerations, there is normally provided a substantial volume between the carburetor discharge and the engine chambers. This volume has a tendency to reduce the vacuum existing at the fuel discharge and that on the downstream side of the throttle valve. This has the effect of further reducing charge velocity into the chamber and results in slow and inefficient combustion.

It is, therefore, a principal object of this invention to provide an improved induction system for an internal combustion engine having multiple chambers. It is a further object of this invention to provide an improved multiple cylinder induction system that incorporates, in addition to the main induction system, a relatively small cross sectional area auxiliary induction system.

SUMMARY OF THE INVENTION

This invention is adapted to be embodied in an induction system for an internal combustion engine having at least two variable volume chambers in which combustion occurs. The induction system comprises first and second main induction passages each of which communicates with a respective one of the chambers for delivering a charge thereto. First and second throttle valves are positioned respectively in the first and second main induction passages for controlling the flow therethrough. First and second relatively small cross sectional area auxiliary induction passages also serve each chamber through a respective auxiliary intake port. The auxiliary intake ports of the auxiliary intake passages communicate with each other downstream of the first and second throttle valves so that an induction charge may be delivered to one chamber during its intake cycle from the portion of the main induction system of the other chamber downstream of the throttle valve. A charge forming device is provided that has a third throttle valve and an idle fuel discharge that cooperates with the third throttle valve for delivering an idle fuel flow. The charge forming device communicates with the main induction passages upstream of the first and second throttle valves.

BRIEF DESCRIPTION OF THE DRAWINGS

FIG. 3 is a cross sectional view taken along the line 3—3 of FIG. 1.

FIG. 4 is a cross sectional view taken along the line 4—4 of FIG. 1.

DETAILED DESCRIPTION OF THE PREFERRED EMBODIMENTS

Figure 1:
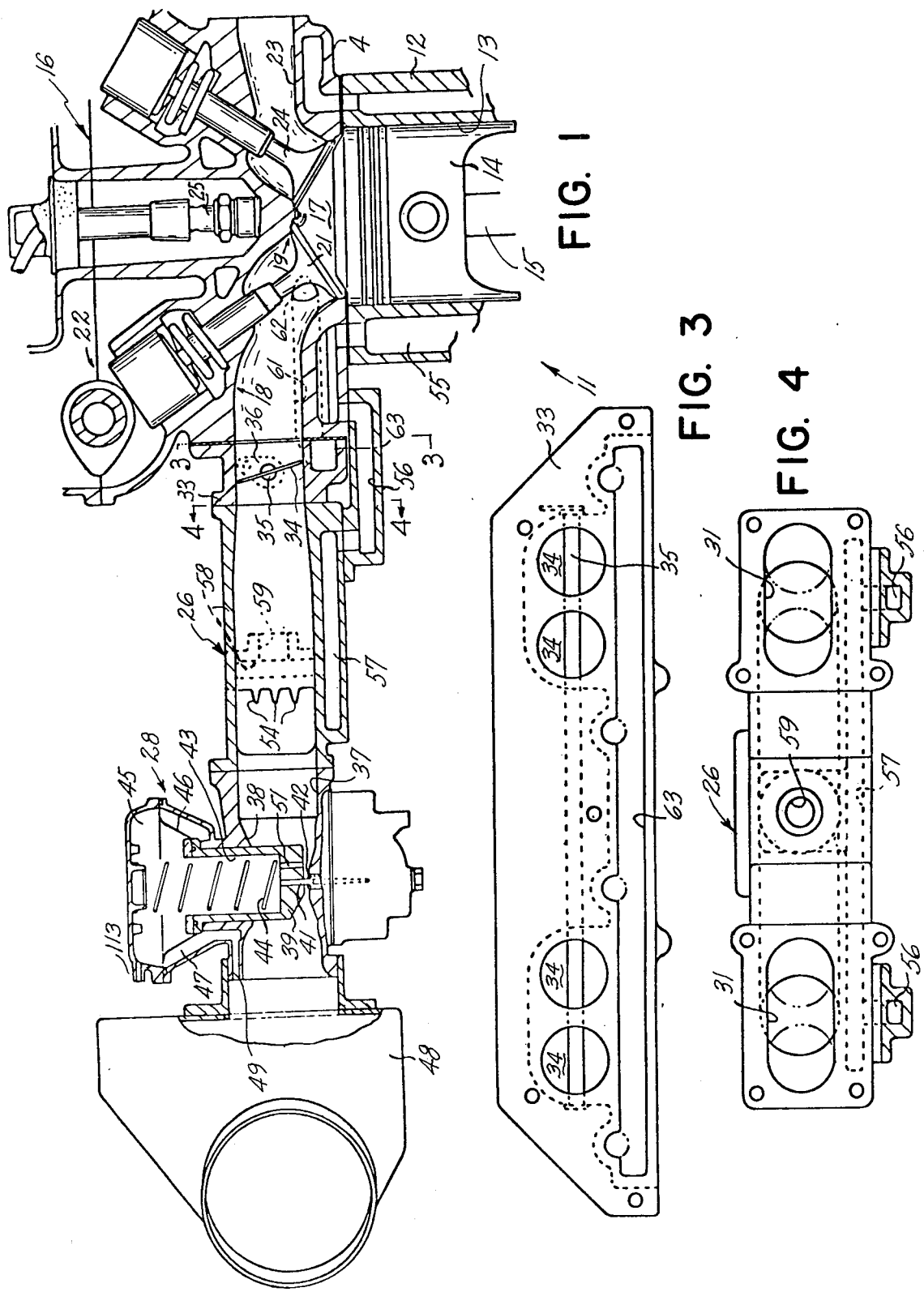
FIG. 1 is a cross sectional view taken through a single cylinder of an internal combustion engine constructed in accordance with a first embodiment of this invention.
Figure 2:
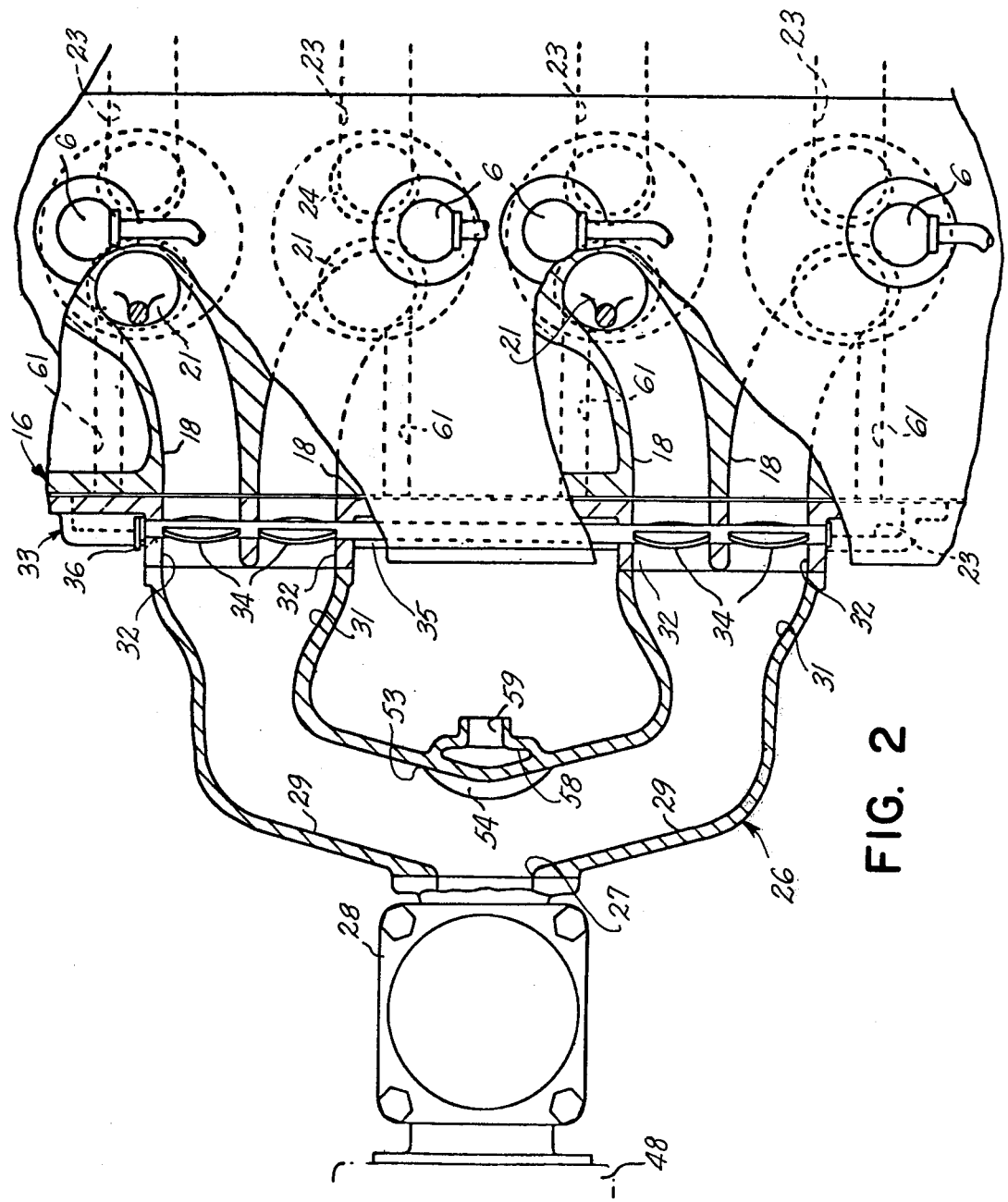
FIG. 2 is a top plan view, with portions broken away, of the engine shown in FIG. 1.

Referring first to the embodiment of FIGS. 1 through 4, a multiple cylinder internal combustion engine embodying this invention is identified generally by the reference numeral 11. The engine 11 includes a cylinder block 12 having a number of cylinder bores 13 (four in this embodiment) in which pistons 14 are slidably supported for reciprocation. The pistons 14 are connected to a crankshaft (not shown) by means of connecting rods 15 in a known manner. A cylinder head, indicated generally by the reference numeral 16, is affixed to the cylinder block 12 and is formed with a number of cavities 17, each of which cooperates with a respective one of the cylinder bores 13 and pistons 15 to provide a chamber of variable volume in which combustion occurs. The chamber 17 will, at times, be referred to as combustion chambers.

Each chamber 17 is served by a main cylinder head intake passage 18 which terminates in a main intake port 19. An intake valve 21 which is operated in any known manner, as by means of an overhead camshaft 22, controls the opening and closing of the valve 21, and accordingly, the communication of the main cylinder head intake passages 18 with the combustion chambers 17.

A cylinder head, indicated generally by the reference numeral 16, is affixed to the cylinder block 12 and is formed with a number of cavities 17, each of which cooperates with a respective one of the cylinder bores 13 and pistons 15 to provide a chamber of variable volume in which combustion occurs. The chamber 17 will, at times, be referred to as combustion chambers.

Each chamber 17 is served by a main cylinder head intake passage 18 which terminates in a main intake port 19. An intake valve 21 which is operated in any known manner, as by means of an overhead camshaft 22, controls the opening and closing of the valve 21, and accordingly, the communication of the main cylinder head intake passages 18 with the combustion chambers 17.

Exhaust passages 23 are formed in the side of the cylinder head 16 opposite the main intake passage 18. Communication between the chambers 17 and the respective exhaust passages 23 is controlled by means of exhaust valves 24 which are operated in any known manner, as by means of an overhead camshaft (not shown).

Spark plugs 25 are provided in the cylinder head 16 and have their gaps exposed in the chambers 17 for selectively firing a charge therein. The spark plugs 25 are fired in any known manner.

The portion of the engine thus far described is conventional, and for that reason the details of the construction which are well known have not been described in any detail.

The main intake passages 18 are supplied with a charge via an intake manifold indicated generally by the reference numeral 26. The intake manifold 26 has an inlet 27 to which a charge is delivered from a carburetor, indicated generally by the reference numeral 28. From the inlet 27 the manifold has a first pair of branches 29 each of which terminates in a respective enlarged portion 31 which enlarged portions in turn communicate with respective inlets 32 formed in a valve block assembly, indicated generally by the reference numeral 33, which is interposed between the intake manifold 26 and the intake side of the cylinder head 16. The inlets 32 each communicate with a respective one of the cylinder head main intake passages 18. Individual manually operated throttle valves 34 are positioned in each of the inlets 32 for controlling the flow therethrough. The throttle valves 34 are affixed to a common throttle valve shaft 35 that is journalled in the block 33 and which carries a bell crank 36 at one exposed end. The accelerator mechanism of the associated vehicle is connected in any known manner to the bell-crank 36 so that the throttle valves 34 may be manually positioned.

The carburetor 28 is of the air valve "SU" type and includes an outer housing which defines an intake passage 37 having a venturi section 38. As is known with this type of carburetor, a piston 39 is slidably supported in the carburetor body at the venturi section 38 so as to provide a variable flow area for the venturi section 38. A needle 41 is affixed to the piston 39 and cooperates with a jet 42 of the carburetor float bowl so as to control the fuel discharge into the the carburetor induction passage 37 depending upon the position of the piston 39.

The position of the piston 29 in the venturi 38 is controlled automatically in response to the induction system vacuum. For this purpose, the piston 39 is formed with a bore 43 in which a spring 44 is received for urging the piston 39 in a downward direction toward its idle position. An actuator chamber 45 is formed in the carburetor body by the bore 43 and by means of a diaphragm 46 that is sealingly engaged at its inner periphery to the piston 39 and is sealingly engaged at its outer periphery to the body of the carburetor 28. An atmospheric chamber 47 is provided on the underside of the diaphragm 46 and is exposed to the pressure at the outlet end of an air cleaner 48 by means of a port 49.

The chamber formed on the upper side of the diaphragm 46 and including the piston bore 43 is exposed to induction system vacuum via a port 51 that extends downwardly through the piston 39 on the downstream side of the needle 41.

The charge from the carburetor 28 passes into the manifold 26 through the inlet opening 27. In opposition to the inlet opening 27 the manifold 26 is provided with a wall 53 that defines in part the branches 29. This wall 53 has raised heating ribs 54 which serve to heat the charge when it passes from the carburetor 28 in a manner now to be described. The cylinder block and engine have a cooling jacket 55 through which liquid coolant is circulated. This liquid coolant also flows through a passage 56 for delivery to a heating jacket 57 formed on the lower side of the intake manifold 27. The jacket 57 has a vertically extending passage which communicates with a heating chamber 58 formed in the wall 53 adjacent the ribs 54. The coolant is returned to the cooling system through an outlet 59 formed in the wall 53. Thus, it should be noted that in addition to serving as a heating riser above the jacket 57, the charge flowing directly from the carburetor 28 impinges upon the heated wall 53 and ribs 54 so as to promote fuel vaporization.

In addition to the main intake passages 18, the cylinder head 16 is provided with relatively small auxiliary induction passages 61. The auxiliary induction passages 61 each terminate in auxiliary intake ports 62 that open into the main induction passages 18 adjacent the main intake ports 19. The ports 62 and passages 61 have an effective cross sectional area approximately one quarter of that of the main intake passages 18 so that a given charge flowing into the chamber 17 through these auxiliary intake ports 62 will enter at a significantly higher velocity so as to promote turbulence in the chamber at the time of ignition of the spark plug 25. This has been found to significantly increase the rate of combustion and accordingly, improve efficiency and exhaust emission control. Furthermore, the accelerated combustion rate permits a higher amount of exhaust gas recirculation (EGR) so as to improve emission control. This higher amount of EGR is achieved without adversely affecting the engine performance.

The auxiliary induction passages 61 each terminate in the side of the cylinder head 16 adjacent the valve block 33. The valve block 33 is formed with a transverse chamber 63 that affords communication between the respective auxiliary intake passages 61. Thus, the passages 61 communicate with each other downstream of the manually operated throttle valves 34.

In operation, when the throttle valves 34 are in their idling position, a high vacuum will be exerted at the port 62 of each chamber 17 when it is in its suction or intake stroke. The charge delivered to the individual chamber will be drawn from the area of the main induction passages of the remaining chamber 17 downstream of the throttle valves 34. Since the throttle valves 34 are substantially closed, the spring 44 will hold the piston 39 in its idling position and only an idle charge of fuel will be delivered from the idle system of the carburetor 28 and or the jet 42 into the induction system. It should be noted that the charge is heated, in the manner previously described, so that vaporization is improved. In view of the fact that the charge is delivered to the chamber 17 through the auxiliary induction system and specifically through the port 62 of the chamber 17 that is in its induction phase, will pass at a high velocity to improve turbulence in the chambers. It desired, the ports 62 and passages 61 may be configured so as to induce a swirl to the charge so as to further improve combustion efficiency.

As the throttle valves 34 are progressively opened, the vacuum sensed at the port 51 will increase and the piston 39 will be raised by the atmospheric pressure acting on the underside of the diaphragm 46. Thus, additional fuel and air is permitted to flow and the predominant portion of this charge will flow directly into the chamber 17 through the main induction passage 18.

Figure 5:
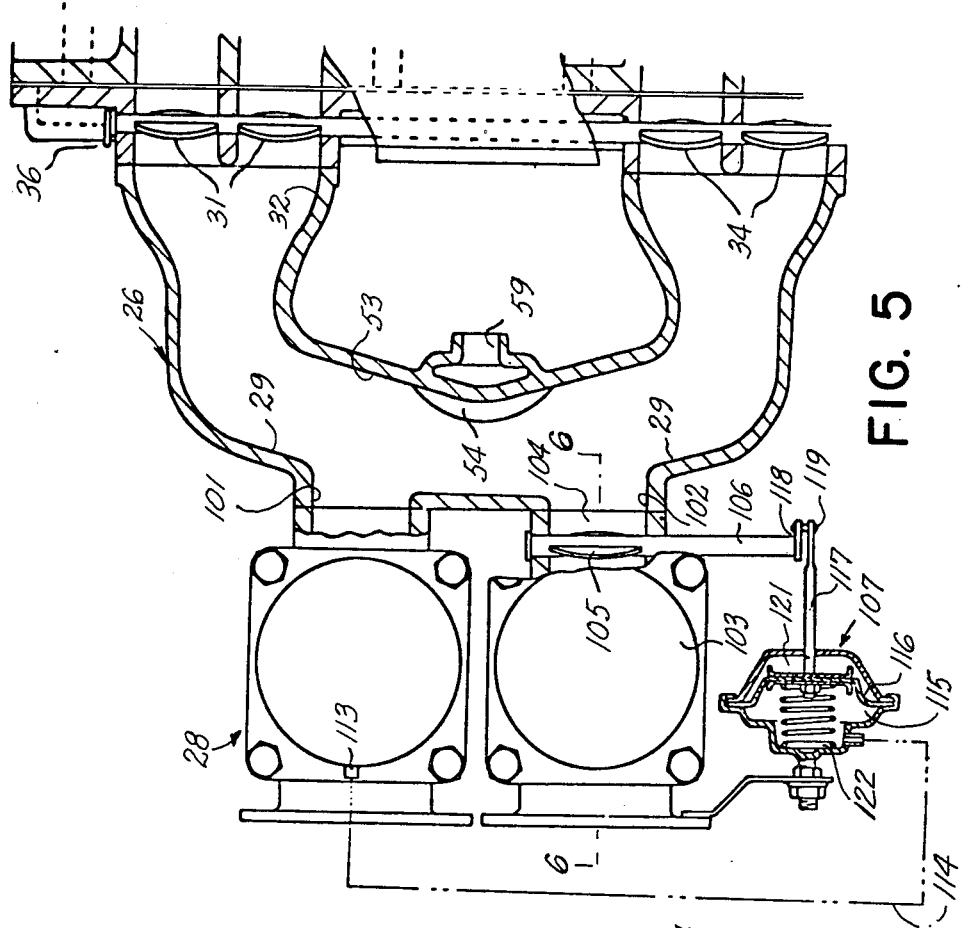
FIG. 5 is a top plan view, with portions broken away, in part similar to FIG. 2 and showing another embodiment of the invention.
Figure 6:
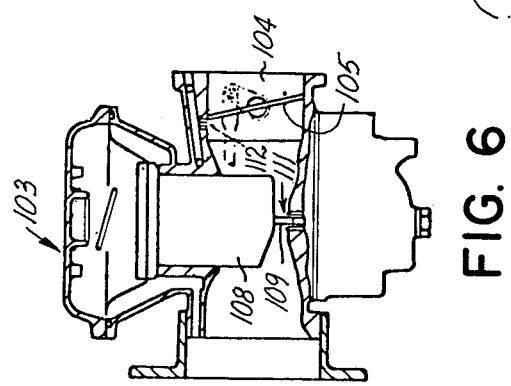
FIG. 6 is a cross sectional view taken along the line 6—6 of FIG. 5.

Another embodiment of the invention is shown in FIGS. 5 and 6. This embodiment is particularly adapted to be used in conjunction with a high output engine. In many regards the embodiment, particularly the configuration of the induction passages and the auxiliary induction system, is the same as in the previously described embodiment. Where these similarities exist, the parts have either been identified by the same reference numeral or have not been illustrated at all. It is believed, however, that the construction and operation of this embodiment will be clear from the previous description and that relating to the structure that is specific to this embodiment.

In connection with this embodiment, the intake manifold 26 is provided with two inlets 101 and 102. The inlet 101 is served by the carburetor 28 which is of the type as afore described and which has the same construction. In connection with this embodiment, a high power carburetor 103 is also provided. The carburetor 103 has its discharge opening 104 in communication with the passage inlet 102. A third throttle valve 105 controls the flow through the passage 104 and is affixed, for this purpose, to a throttle valve shaft 106. The shaft 106 is connected to a vacuum actuator 107 so that the carburetor 103 will deliver charge to the manifold 26 only at high load operation. At idle and low speed, the charge requirements of the engine will be supplied purely by the carburetor 28.

Referring particularly to FIG. 6, the carburetor 103 has a piston 108 which is operated in a manner similar to that of the previously described embodiment. For this reason, description of its operation will not be repeated. As with the previously described embodiment, the piston 108 has affixed to it a metering rod 109 that cooperates with a jet 111 in the fuel bowl for controlling the fuel flow.

In order to smooth the operation of the carburetor 103 when it begins to discharge due to opening of the throttle valve 105, transition ports 112 are provided in the body adjacent the closed position of the throttle valve 105.

The carburetor 28 is provided with a sensing port 113, which is also shown in FIG. 1, but which will be blocked off when only one carburetor is used as in the embodiment of FIGS. 1 through 4. In this embodiment, however, the sensing port 113 is connected by a conduit 114 to a vacuum chamber 115 of the actuator 107. The chamber 115 is bounded by a flexible diaphragm 116 which is connected to a piston rod 117 which is, in turn, connected to a bellcrank 118 on the throttle valve shaft 106 by means of a pin 119. An atmospheric chamber 121 is provided in opposition to the chamber 115 and is exposed to atmospheric pressure in any suitable means as by means of the clearance in the rod 117 and the housing of the actuator 107.

A spring 122 is provided in the chamber 115 for normally urging the throttle valve 105 to its closed position when the engine is operating at low speed.

In operation, the throttle valve 105 is normally held closed by action of the spring 122 until the air flow through the venturi 38 of the carburetor 28 is at a predetermined high rate. At this high output, the vacuum sensed through the port 51 is transmitted through the port 113 and conduit 114 to the actuator chamber 115. Atmospheric pressure in the chamber 121 will then overcome the action of the spring 122 and the third throttle valve 105 will open. The carburetor 103 will then commence delivery of additional fuel to the manifold 26 for high power operation.

It should be readily apparent from the foregoing description that an arrangement is provided wherein the individual manually operated throttle valves, which are positioned close to the combustion chambers need not be a part of the carburetor and need not be juxtaposed to the fuel discharge system. Thus, it is not necessary to provide an individual idle circuit for each of these throttle valves. In the illustrated embodiment each auxiliary intake port is in communication with all of the remaining auxiliary passages of the remaining cylinders. Communication with a lesser number of cylinders is, of course, possible so long as there is communication with one cylinder that is not on its intake cycle at the time the served cylinder is on its intake cycle. Also, the invention has been described in conjunction with a "SU" type of carburetor. It should be readily apparent that this invention is susceptible of use with carburetors of other types.

Various other changes and modifications may be made without departing from the spirit and scope of the invention, as defined by the appended claims.

What is claimed is:

1. An induction system for an internal combustion engine having at least two variable volume chambers in which combustion occurs, said induction system comprising first and second main induction passages each communicating with a respective one of said chambers for delivering a charge thereto, first and second manually operated throttle valves in said first and second induction passages, respectively, for controlling the flow therethrough, first and second auxiliary induction passages having a substantially lesser effective cross sectional area than said main induction passage and communicating with said chamber through auxiliary intake ports, said auxiliary induction passages being in communication with each other and with said main induction passages downstream of said first and second throttle valves for delivering at least a portion of the charge to the chamber in its induction cycle from the portion of the main induction passage serving the other chamber downstream of its respective throttle valve, a charge forming device having an idle fuel discharge a third automatically operated throttle valve juxtaposed to said idle fuel discharge, and means for delivering the fuel charge from said charge forming device to said main induction passages wherein the third valve is automatically actuated in response to the flow through the induction system, the first and second main induction passages have a common inlet, the charge forming device being positioned at the common inlet, there being a wall in opposition to said common inlet from which the first and second main induction passages branch, and means for heating said wall for heating the charge delivered by the charge forming device.

2. An induction system as claimed in claim 1 wherein the charge forming device comprises a carburetor and the third throttle valve is a part of the carburetor.

3. An induction system as claimed in claim 2 wherein the additional fuel discharge comprises a slow speed fuel discharge port.

4. An induction system as claimed in claim 2 wherein the third valve comprises a movable piston for providing a venturi for the carburetor.

5. An induction system as claimed in claim 1 wherein the flow is sensed by sensing the pressure at a venturi section.

6. An induction system as claimed in claim 1 further including a second charge forming device for providing a high speed fuel flow for the chambers.

7. An induction system as claimed in claim 6 wherein the second charge forming device discharges into the induction system contiguous to the first charge forming device and its discharge is controlled by the first charge forming device.

* * * * *